United States Patent Office 3,547,582
Patented Dec. 15, 1970

3,547,582
METHOD FOR MANUFACTURE OF HIGH PURITY IRON OXIDE POWDER
Kiichi Arakawa, Tokyo, Japan, assignor to Nippon Steel Corporation, Tokyo, Japan
No Drawing. Filed Aug. 30, 1966, Ser. No. 575,984
Int. Cl. C01g *49/02;* C07d *107/00;* C21b *1/00*
U.S. Cl. 23—200                                          3 Claims

ABSTRACT OF THE DISCLOSURE

Process for producing high purity ion oxide powder by decomposition of a β-dicarbonyl iron chelate or β-ketoamino iron chelate in hydrazine hydrate or anhydrous hydrazine. The resultant iron oxide powder is reduced and then treated by the floating zone melting method.

---

The present invention relates to a method for the manufacture of high purity iron oxide, and more particularly to a process for producing high purity iron oxide powder by decomposition of β-dicarbonyl iron chelate or β-ketoamino iron chelate, thereby to obtain iron of very high purity.

In the past, several methods were tried for obtaining high purity iron, which became the basis of the studies on iron and steel properties.

There are, for example, electrolytic iron obtained by electrolytic decompostion of a $FeCl_2$ solution, carbonyl iron produced by resolution of iron carbonyl, vacuum-molten iron and the like.

However, the high purity iron obtained by the above processes results in a purity no higher than 99.9%–99.98%, a purity superior thereto having been impossible.

Further, there was developed the method of purification of the metal by a process of zone melting, thus obtaining iron of very high purity in the range of 99.99999999% against germanium and the like. However, even if the method of zone melting is utilized relating to the iron, it is almost impossible to remove the elements existing in the raw material, such as Ni, Co and Cr.

This invention provides a method for manufacturing a high purity iron in the range of 99.999% and produces especially magnetic high purity iron oxide powder by a treatment of organic chemistry, thereby to obtain the above said high purity iron by usual reduction of the powdered iron oxide with hydrogen followed by the method of zone melting.

In order to obtain high purity iron oxide powder, this invention has the characteristic points of initially producing a specific purified organic π complex having the following formula:

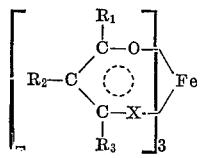

where X is O or where X is O or N, and $R_1$, $R_2$ and $R_3$ are selected from among H or halogen, or a substance are selected among H or halogen, or a substance obtained by forming an iron chelate compound with aliphatic hydrocarbon, alicyclic hydrocarbon or aromatic hydrocarbon residues, and then reacting this complex with organic amines, preferably hydrazine derivatives, whereby a precipitate of iron oxide having magnetite as a main component is obtained.

In the above formula, $R_1$, $R_2$, and $R_3$ may, for example, be H, halogen, $CH_3$, $C_2H$, cyclohexyl, phenyl,

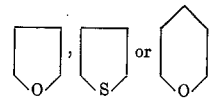

the latter three radicals being attached to the chelate ring through any carbon atom on the radical.

According to this invention, the β-carbonyl iron chelate or β-ketoamino iron chelate employed for raw material possesses properties different from those of general complex salts. The so called organic π complex is described as an oxide, possesses aromatic properties and generally is easily soluble in organic solvents but difficultly soluble in water. Further, the purification thereof is possible by recrystallization depending on each organic solvent, this purification being also possible by distillation, sublimation and the like. As for such purpose the β-carbonyl ion chelate or β-ketoamino iron chelate is purified by a purification method of organic chemistry in a synthetic process. If the ferric salt constituting the π-complex raw material is initially purified by dissolution, extraction and the like, a β-dicarbonyl iron chelate or a β-ketoamino iron chelate having very high purity can be obtained.

In the present invention, the high purity iron oxide powder is produced by dissolving, in an organic solvent such as alcohol and benzene, the said β-dicarbonyl iron chelate or β-ketoamino chelate of high purity and carrying out reaction thereof at a pH 8–10 using, as a decomposition agent, a hydrazine derivative. Acid or alkali is not employed for the decomposition, even if it can be obtained, because of the formation of iron hydroxide and iron halide in such case. The resultant magnetic iron oxide powder is reduced with hydrogen to obtain metallic iron powder, from which the gaseous components are then removed as completely as possible by the zone melting process, whereby a purified metal iron of very high purity is finally obtained.

In the following, practical examples of this invention are described.

PRACTICAL EXAMPLE 1

[Table 1 shows the chemical analytical values of the electrolytic pure iron powder utilized as raw material.]

| | Element | | | | | | | | | | |
|---|---|---|---|---|---|---|---|---|---|---|---|
| | Mn | Cu | Ni | Cr | Co | Al | Mo | C | S | O | P | Si |
| Raw material: electrolytic pure iron powder | 55 | 6 | 67 | 10 | 94 | 11 | | 14 | 47 | 23 | ---- | 17 | 190 |

Note—Unit: p.p.m. by weight.

This electrolytic pure iron powder (mesh 100, purity 99%) is dissolved in 20% HCl, and extracted in methyl isobutyl ketone (below abbreviated as MIBK). The layer of MIBK is then extracted reversely in pure water obtained by purification through an ion exchange resin and distillation of the resultant water), thereby yielding an aqueous solution of purified $FeCl_3$.

450 g. of acetylacetone are added to this aqueous solution of purified $FeCl_3$ containing 160 g. of $FeCl_3$, and the mixture is stirred for about 2 hours at a pH value of 7–8, thus obtaining 350 g. of acetylacetone iron chelate. This iron chelate is purified by sublimation under reduced pressure, thereby yielding 320 g. of high purity acetylacetone iron chelate.

The said purified iron chelate is dissolved in methanol, and 300 g. of hydrazine hydrate are added to resultant solution dropwise at a solution temperature of 30° C. When stirred for 30 minutes, 70 g. of iron oxide, existing as a mixture of hematite and magnetite where the main component is magnetite, are yielded.

The resultant iron oxide powder is first reduced for 7 hours at 450° C. using hydrogen passed through hot water having a temperature of 60° C., is then mixed well after being cooled, again reduced for 7 hours at 450° C., heated for 30 minutes at 700° C., again cooled and finally taken out.

Thereafter, the metal iron powder is molded under elevated pressure. Both ends of said moldings are welded to rotund bars made of vacuum-molten pure iron, and molten moldings are obtained at a velocity of 0.2 mm./min., the method of zone melting into a suspension of hydrogen and/or argon.

The analytical values obtained by chemical analysis of the resulting high purity iron are shown in the following Table 2, in which the values of commercial malleable iron are added as a comparative reference.

TABLE 2.—VALUES OF CHEMICAL ANALYSIS OF HIGH PURITY IRON

| | Element | | | | | | | | | | |
|---|---|---|---|---|---|---|---|---|---|---|---|
| | Mn | Cu | Ni | Cr | Co | Al | Mo | C | S | O | P |
| Samples: | | | | | | | | | | | |
| This high purity iron | <2 | 1 | 2 | <1 | 2 | 10 | <1 | 8 | 3 | <5 | <2 |
| Commercial high purity iron | 6 | 3 | 14 | 4 | 3 | 12 | 2 | 7.5 | 11 | 45 | 2 |

NOTE.—Unit: p.p.m. by weight.

Further, the purity of the commercial highly pure iron is at most 99.98%, but it is possible to obtain a very highly pure iron of 99.999% by purifying the highly pure iron oxide, yielded by the method of this invention, through the zone melting process.

The iron raw material utilized in this practical example is electrolytic iron; however, in this invention, besides electrolytic iron, carbonyl iron, ordinary iron or iron ore may be employed. In this example, methyl isobutyl ketone is used for the extraction-purification of ferric oxide; but the extraction-purification using, such extraction solvents as ethers or methyl ethyl ketones is also possible. However, the efficacy of MIBK is remarkably superior.

Further, the formation of β-dicarbonyl iron chelate is, of course, possible by any convenient method in addition to that of this example. As for the iron salt utilized, iron sulfate, iron nitrate and the like may be employed. If there is no question of the reaction time, then for preparing β-dicarbonyl derivatives, β-diketones or malonaldehydes may be utilized, and iron chelates can be obtained by reacting one of them, for example acetylacetone, with metal iron without utilizing a solvent.

As the decomposition agent to be employed in this invention (a hydrazine derivative), hydrazine hydrate and anhydrous hydrazine are especially desirable. Concerning the conditions of decomposition, the reaction may be promoted in an atmosphere of inert gas, such as hydrogen or nitrogen, and in anhydrous solvent; but the iron oxide may also be obtained by promotion with only a reagent for decomposition without use of any solvent.

The organic solvent utilized during the decomposition is not critical and, when water is mixed with methanol, acetone, chloroform or the like at the time of the decomposition of hydrazine hydrate, an organic solvent is desirable.

Further, concerning the quantitative relations of the decomposition agent to the iron chelate, an amount of the former which is greater than the theoretical value is convenient. When a small amount is employed, the reaction temperature must be increased.

What is claimed is:

1. In a method for obtaining an iron compound containing oxygen by the decomposition of acetylacetone iron chelate, the improvement wherein iron oxide powder is prepared by the decomposition of acetylacetone iron chelate utilizing hydrazine hydrate or anhydrous hydrazine as decomposition agent.

2. A process according to claim 1, wherein the acetylacetone iron chelate is dissolved in an organic solvent, 3. An improvement according to claim 2, wherein the acetylacetone iron chelate dissolved in the organic solvent is decomposed at a pH of 8 to 10.

References Cited

UNITED STATES PATENTS

| 2,636,892 | 4/1953 | Mayer | 23—200 UX |
| 2,809,905 | 10/1957 | Davis et al. | 75—65 X |
| 3,014,939 | 12/1961 | Kluiber | 260—429 |
| 3,197,274 | 7/1965 | White | 260—429 X |
| 3,211,521 | 10/1965 | George et al. | 23—200 X |
| 3,224,873 | 12/1965 | Swanson | 260—429 X |
| 3,272,853 | 9/1966 | Braun | 260—429 X |
| 3,301,660 | 1/1967 | Imamura | 75—65 X |

HENRY W. TARRING, II, Primary Examiner

U.S. Cl. X.R.

75—.5, 34, 43; 260—429